United States Patent [19]

Kakuta

[11] Patent Number: 5,001,693
[45] Date of Patent: Mar. 19, 1991

[54] RADIO FREQUENCY SIGNAL PROCESSING CIRCUIT WHICH PREVENTS STEPWISE VARIATION OF A DC COMPONENT

[75] Inventor: Yoshiyuki Kakuta, Saitama, Japan

[73] Assignee: Pioneer Electronic Corp., Tokyo, Japan

[21] Appl. No.: 581,175

[22] Filed: Sep. 5, 1990

Related U.S. Application Data

[63] Continuation of Ser. No. 206,067, Jun. 13, 1988, abandoned.

[30] Foreign Application Priority Data

Jul. 8, 1987 [JP] Japan .................................. 62-171549

[51] Int. Cl.$^5$ ............................................. G11B 7/00
[52] U.S. Cl. .................................... 369/48; 369/44.31; 369/44.34
[58] Field of Search ............... 369/44.29, 44.31, 44.34, 369/44.39, 47, 48, 124; 360/77.04, 77.06, 77.14, 77.15, 77.11, 77.08

[56] References Cited

U.S. PATENT DOCUMENTS

| | | | |
|---|---|---|---|
| 4,408,314 | 10/1983 | Yokota | 369/44.31 |
| 4,663,751 | 5/1987 | Kaku et al. | 369/44.34 |
| 4,682,314 | 7/1987 | Nakagaki et al. | 369/44.34 |
| 4,807,210 | 2/1989 | Kaku et al. | 369/44.31 |
| 4,815,061 | 3/1989 | Yasumura et al. | 369/48 |

FOREIGN PATENT DOCUMENTS 61-180937 8/1986 Japan .................................. 369/48

Primary Examiner—Donald McElheny, Jr.
Attorney, Agent, or Firm—Sughrue, Mion, Zinn, Macpeak & Seas

[57] ABSTRACT

A reference level adjusting circuit for a signal containing both DC and RF components, such as provided by a read head in an optical recording and reproduced device. In the reproduction mode, the read input signal is capacitively coupled through an amplifier to an A/D converter. A read input signal detected from an unrecorded area is held and, during the recording mode, is substituted for the presently read input signal.

8 Claims, 3 Drawing Sheets

RADIO FREQUENCY SIGNAL PROCESSING CIRCUIT WHICH PREVENTS STEPWISE VARIATION OF A DC COMPONENT

This is a continuation of application Ser. No. 07/206,067 filed June 13, 1988 now abandoned.

BACKGROUND OF THE INVENTION

1. Field of the Invention

The present invention relates to a signal processing circuit. It more particularly relates to a radio frequency signal (hereinafter referred to as an "RF signal") processing circuit which is applicable to an optical recording and reproducing apparatus for an optical disk for information interchange.

2. Description of the Background Art

There are two different techniques which are employed for tracking control of an optical recording and reproducing system.

One is called a continuous servo method. In this system, signals are optically recorded in a continuous spiral groove or on the continuous land on a disk surface between the wraps of the spiral groove.

The other is called a sampled servo method In this system wobble marks (pits) for tracking control and one clock mark (pit) for synchronization are formed at the positions of servo bytes in a preliminarily formed track on the disk surface.

FIG. 5 illustrates a sample of the block diagram of a prior art RF signal processing circuit for an optical recording and reproducing apparatus with the continuous servo method. The reproduced signal from a pick-up head 9 is supplied to a head amplifier 1. The head 9 is radially movable adjacent to a rotating optical disk 10. The reproduced signal is boosted by the head amplifier 1 and then applied to the signal processing circuit 3 through a coupling capacitor 2. The signal processing circuit 3 operates upon the signal in order that it be easily decoded, for example equalizing it, and applies binary conversion to it against a predetermined reference level The output from the signal processing circuit 3 is inputted to a decoder 4. The address information included in the ID signal which was recorded beforehand in the form of a pre-pit, is derived from the output of the decoder 4.

There will now be described a process consisting of the steps of recording an information signal into a first block on the disk and reproducing the recorded signal from a second block adjacent the first block on the disk. The wave form of the RF signal applied to the head amplifier 1 through the pick-up head is illustrated in trace (a) of FIG. 6. At the pre-formatted ID area of the first block to be recorded, the ID signal is first reproduced. Then when the head is at the data area of the first block, other means than the pick-up part of the head are optically recording data in this data area. However, a signal which corresponds to the data being recorded is applied to the head amplifier 1 since the optical data signal being recorded is reflected from the disk surface and detected by the pick-up head. In the second block, the next ID and data signals are reproduced and applied to the head amplifier from the ID and data areas. Even though the signal level which is applied to the head amplifier 1 from the recorded signal by light reflection is high enough at the corresponding pit, the signal level which is applied from the reproduced signal in the corresponding pits of the second block is much lower. Due to this fact at the switching point of the process from signal recording to signal reproducing, the average signal level is stepwise changed. Though the situation is as described above, a DC component can be easily removed from the signal by selecting the coupling time constant of the capacitor 2, for example over 30 kHz as a high-pass cut-off frequency, because there is sufficient distance between the ID area and the data area of the preceding block. In this case, the RF signal output from the capacitor 2 is as shown in trace (b) of FIG. 6. Therefore, it is possible to detect and correctly reproduce the ID and data signals of the following block by the binary conversion of the RF signal with a corrected ground level and by the subsequent decoding.

FIG. 7 illustrates a sample of the block diagram of an RF signal processing circuit for an optical recording and reproducing apparatus using the sampled servo method of the prior art. An example of the RF signal wave form to be applied to the head amplifier 1 through the pick-up head is shown in trace (a) of FIG. 8. In this case, the blank signal from the unrecorded data area is detected and applied from the unrecorded first data block. A predetermined recorded data signal in the servo byte is detected by light reflection and applied to the head amplifier from the recorded second data block. Furthermore, an ID data signal is detected and applied from the third block. These signals are applied through a coupling capacitor 11 to an amplifier 12. Then the output from the amplifier 12 is introduced to an A/D converter 13 for conversion to digital form. In the case of the optical disk of the continuous servo tracking type, the data signal is converted by M2 modulation, which is different for the optical disk of the sampled servo tracking type, which relies upon, for example, 4–15 modulation. Therefore, in the signal processing for the sampled servo method, not only binary conversion but also analog to digital conversion is required.

In the optical disks using the sampled servo tracking method, the distance between the servo byte area and the data area is not great. In order to accurately maintain the original wave form, the cut-off frequency of the coupling capacitor 11 should be set at less than one-tenth of the sampling frequency, for example 41.3 kHz. In this context, the coupling time constant of the capacitor 11 should be large to a certain extent. Due to this fact when the signal is recorded with a large magnitude level optical beam, the average DC component of the output signal from the capacitor 11 rises for a while, as is illustrated in trace (b) in FIG. 8. In other words, the base line level of the RF signal from a reproduced data block, which is read after an adjacent data recorded block, rises from the ground level. Heretofore, to attain the effective A/D conversion even in such cases, the input dynamic range of the A/D converter 13 should be designed with a greater margin beyond the expected signal gain range extending from ground as the maximum level varies towards the negative side. This means that the resolution for the A/D conversion is degraded in the condition of a fixed dynamic range, and further means that the dynamic range must be expanded to obtain a predetermined level of resolution.

SUMMARY OF THE INVENTION

An object of the present invention is to provide an RF processing circuit which makes it possible to prevent the stepwise variation of the DC component in the RF signal at the time of switching from a recording mode to a reproducing mode in order to effectively apply the dynamic range of the A/D converter.

This object of the present invention is accomplished by an RF signal processing circuit which comprises a hold circuit to maintain the predetermined level of a RF signal reproduced from a recording/reproducing medium, and a switch to select the reproduced RF signal in the reproducing mode and to select the output signal from the hold circuit in the recording mode. An amplifier boosts the output signal from the switch, with a coupling capacitor connected between the switch and the amplifier. An analog to digital converter converts the output signal from the amplifier.

In the RF signal processing circuit of the present invention, an RF signal which is reproduced from a recording and reproducing medium is applied to a hold circuit by which it is maintained at the predetermined level such as an average level or within some set variation. A switch selects the reproduced RF signal when it is in the reproducing mode, and it selects the output from the hold circuit in the recording mode. The signal selected by the switch is boosted by an amplifier and then applied to an A/D converter to be converted. In this procedure, the RF signal processing circuit of the present invention successfully prevents the occurrence of stepwise variation of the DC component of the RF signal when the mode is changed between recording and reproducing.

DESCRIPTION OF THE PREFERRED EMBODIMENT

The following embodiments are provided to aid the understanding of the present invention, and variations may be made by one skilled in the art without departing from the spirit and scope of the present invention.

Figure 1:
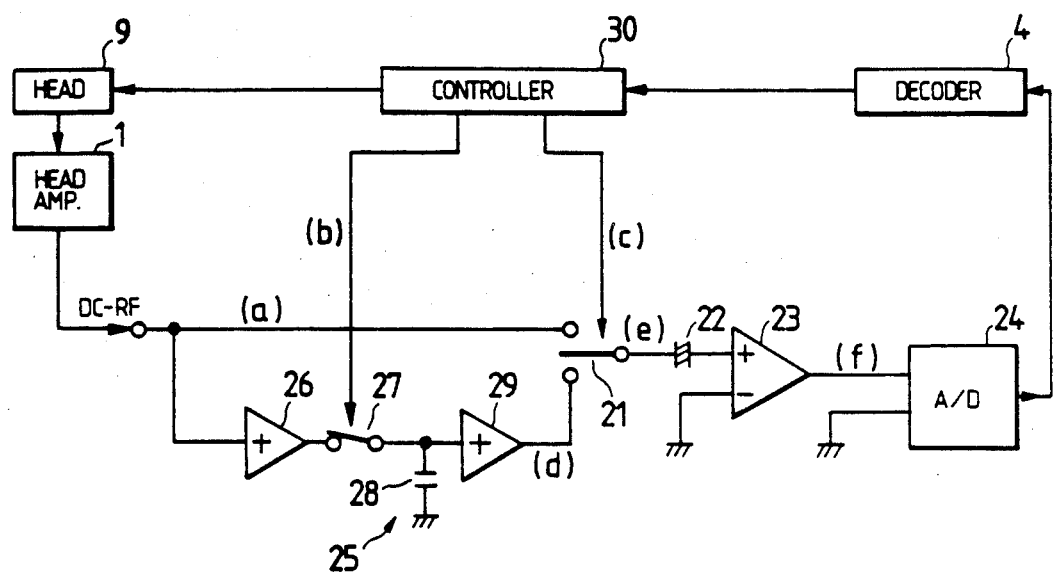
FIG. 1 is a block diagram illustrating a first embodiment of the RF signal processing circuit of the present invention.
Figure 2:
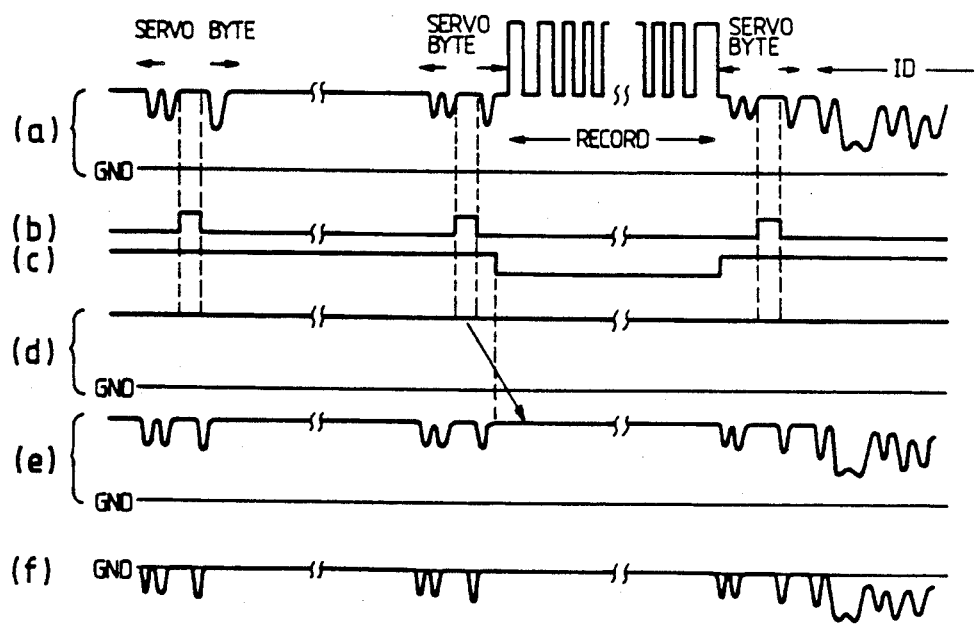
FIGS. 2(a)-(f) are timing charts illustrating an example of the operating process of the RF signal processing circuit of the present invention.

FIG. 1 is a block diagram illustrating one of the embodiments of the RF signal processing circuit of the present invention. The RF signal such as that shown in trace (a) of FIG. 2 is supplied from a pick-up head 9 to this circuit. As illustrated in trace (a), the overall process includes the steps of reproducing the first block where no signal is recorded, recording data in the second block and reproducing the ID signal from the third block. The reproduced RF signal from the head 9 is applied to one input terminal of a switch 21 and at the same time it is inputted to a hold circuit 25. The hold circuit 25 comprises buffer amplifiers 26 and 29, a switch 27 between the buffer amplifiers 26 and 29 and a capacitor 28 coupling the input of the second buffer amplifier 29 to ground. The switch 27 is controlled by a switching signal illustrated in trace (b) of FIG. 2, which is generated by the mirror surface region of the disk that is located between the second wobble marks and the clock mark on the servo bytes. It is kept "on" while the mirror surface region goes by, and kept "off" at other times. Since the wobble marks and clock marks are detected and used by a controller 30 for other purposes in the prior art the detection of the mirror surface region is easily achieved. As a result of the switching signal, the signal level of the mirror surface region of each block is sampled and held by the capacitor 28 after passing through the buffer amplifier 26 and the switch 27. The held signal is applied to another input terminal of the switch 21 after passing through the buffer amplifier 29. The wave form of the held signal is illustrated in trace (d) of FIG. 2.

Figure 8:
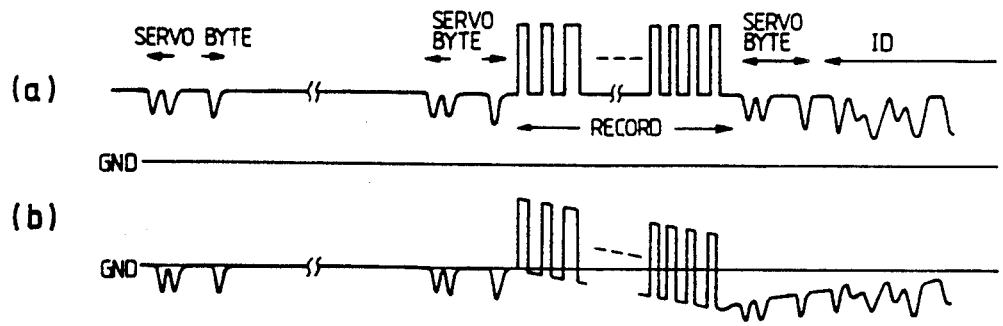
FIGS. 8(a) and (b) are timing charts illustrating the operating process of the prior art processing circuit of FIG. 7.

The switch 21 is controlled by a mode signal illustrated in trace (c). which is "low" while an optical disk is being recorded in a "recording mode" and is "high" for other modes. The head 9 is capable of optically recording on the disk electrical signals provided to it from the controller 30. Hence the output of the switch 21 is of the form illustrated in trace (e) of FIG. 2. That is to say, in the reproducing mode, the signal reproduced from an optical disk is selected and directly outputted. In the recording mode, the signal with a level of the immediately preceding mirror surface region of the servo byte is selected and outputted. As a result of this fact, in the process of switching the mode from recording to reproducing, the occurrence of the stepwise variation of the DC component of the RF signal is prevented. Even in the case of the usage of the coupling capacitor 22 with a comparatively large time constant, the output signal from an amplifier 23, such as a video amplifier, which is inputted from the switch 21 through the coupling capacitor 22, retains its reference level near to the ground level as it is demonstrated in trace (f) of FIG. 2. It is different from the prior art situation in which the base line level of the signal departs from the ground level, such as shown for the prior art in trace (b) of FIG. 8. In designing an A/D converter 24 receiving the output signal of the amplifier 23, the input dynamic range for the A/D converter 24 can be allocated between the ground level as the maximum and the lowest level of the signal itself as the minimum.

Figure 3:
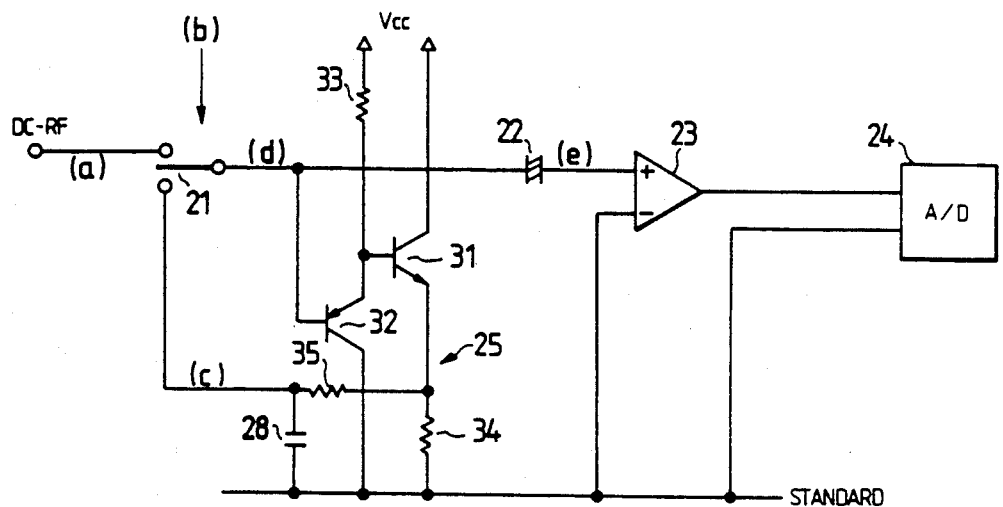
FIG. 3 is a block diagram illustrating another embodiment of the RF signal processing circuit of the present invention.

FIG. 3 is a block diagram illustrating another embodiment of the RF signal processing circuit of the present invention. In this embodiment the hold circuit 25 is composed of an NPN transistor 31, a PNP transistor 32, resistors 33–35 and a capacitor 28.

The input terminal of the hold circuit 25 is connected to the output terminal of the switch 21. The other input terminal of the switch 21 is connected to the coupling point between the capacitor 28 and the resistor 35. This coupling point provides the output signal of the hold circuit. The rest of the circuit is the same as in FIG. 1.

Figure 4:
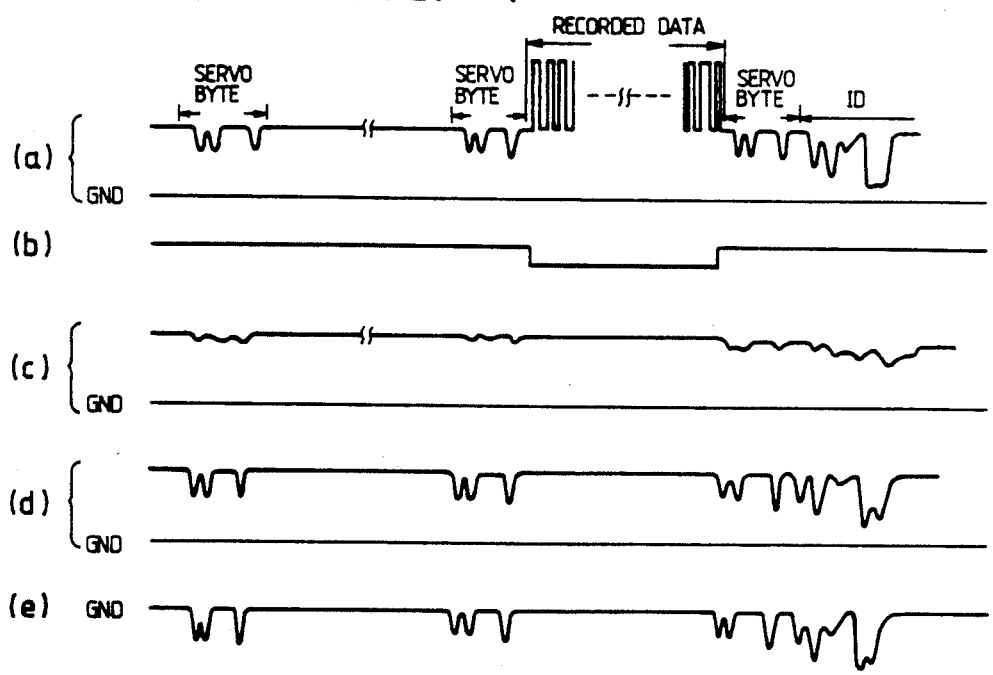
FIGS. 4(a)-(e) are a timing chart illustrating an example of the operating process of the RF processing circuit of the embodiment of FIG. 3.
Figure 5:
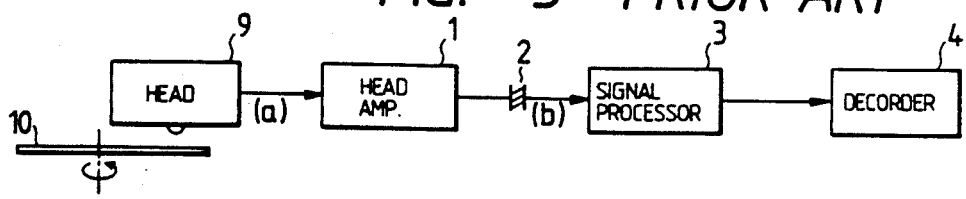
FIG. 5 is a block diagram illustrating an RF signal processing circuit in the prior art FIGS. 6(a) and (b) illustrate a wave form which is outputted from the coupling capacitor of the prior art processing circuit in FIG. 5.
Figure 6:
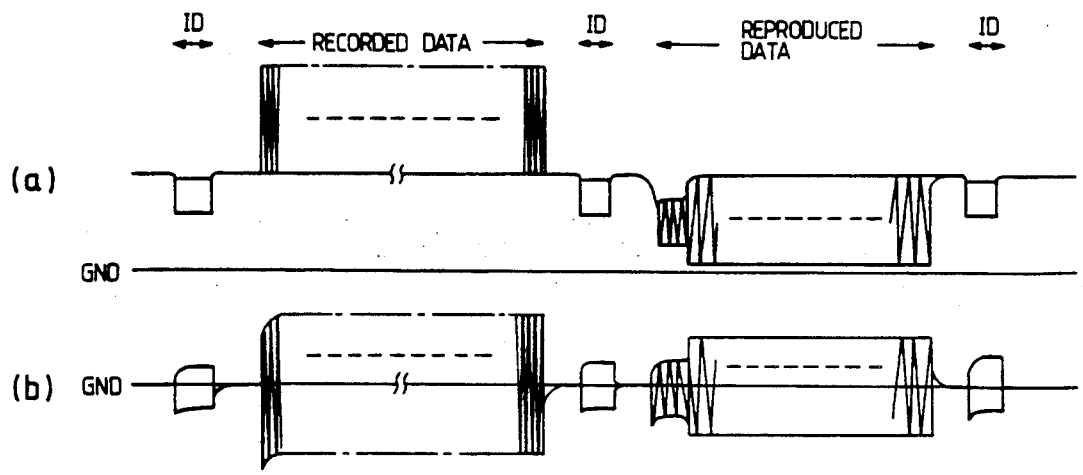
Figure 7:
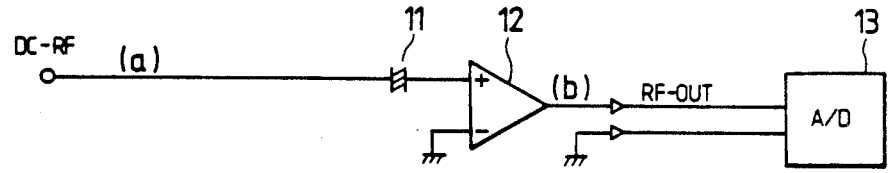
FIG. 7 is a block diagram illustrating another RF signal processing circuit in the prior art.

As was described above for the first embodiment, when the RF signal shown in trace (a) of FIG. 4 is inputted, the switch 21 is controlled by the mode signal from the controller 30 shown in trace (b) of FIG. 4. In the reproducing mode, the switch 21 is set to select and output the reproduced signal from the optical disk. At the same time, as the reproduced RF signal drives the transistors 32 and 33, the voltage corresponding to the average level of the RF signal is charged in the capacitor 28.

When the recording and reproducing apparatus is in the recording mode, the switch 21 is set to select and output the charged voltage from the capacitor 28.

Finally, the output signal from the switch 21 is that shown in trace (d) of FIG. 4. Also, the signal for which the DC component is subtracted from the RF output of the switch 21 by action of the capacitor 22 is that shown in trace (e) of FIG. 4.

Hence because the DC component in the RF signal does not undergo a stepwise change, designing the dynamic range of the A/D converter 24 is easily accomplished.

As was indicated above, the RF signal processing circuit in accordance with the present invention selects the reproduced signal for its output in the reproducing mode and selects the held signal of predetermined level produced from the reproduced RF signal for its output. Therefore, it successfully provides the RF signal processing circuit in which the occurrence of the stepwise variation of DC component in RF signal is prevented so as to effectively reduce the required dynamic range of the A/D converter.

What is claimed is:

1. In a recording and reproducing apparatus, a radio frequency signal processing circuit for preventing stepwise variations of a DC component of a radio frequency signal comprising:
   a hold circuit for holding a level of a selected time portion of an input signal reproduced from a recording/reproducing medium;
   a switch for selecting said input signal during a first time period, and for selecting an output signal of said hold circuit during a second time period;
   control means for determining said selected time portion, said first time period, and said second time period;
   a coupling capacitor connected to an output of said switch;
   an amplifier for amplifying a signal at said output of said switch through said coupling capacitor; and,
   an analog-to-digital converter for converting said output from said amplifier to a digital signal.

2. A signal processing circuit as recited in claim 1, wherein said control means causes said first time period to extend over a reproducing mode of said apparatus and said second time period to extend over a recording mode of said apparatus.

3. A signal processing circuit as recited in claim 2, wherein said recording/reproducing medium is an optical disk containing mirror surface portions formed between predetermined marks in tracks thereof, and said control means causes said selected time portion to correspond to one of said mirror surface portions.

4. An optical recording and reproducing device, comprising:
   means for optically recording a signal on an optical disk;
   means for optically reproducing a signal from said optical disk;
   a hold circuit for holding a level of said reproduced signal reproduced during a selected time portion when said recording means is inoperative;
   a switch for selecting said reproduced signal during a first time period and for selecting said held level during a second time period, said second time period extending over an operational period of said recording means;
   control means for determining said selected time portion, said first time period, and said second time period;
   a coupling capacitor receiving an output of said switch;
   an amplifier for amplifying an output of said coupling capacitor; and
   an analog-to-digital converter for converting an output of said amplifier.

5. In a recording and reproducing apparatus, a radio frequency signal processing circuit for preventing stepwise variations of a DC component of a radio frequency signal comprising:
   a hold circuit for holding a level of a selected time portion of an input signal reproduced from a recording/reproducing medium;
   a switch for selecting said input signal during a first time period, and for selecting an output signal of said hold circuit during a second time period;
   control means for determining said selected time portion, said first time period, and said second time period;
   a coupling capacitor connected to an output of said switch;
   an amplifier for amplifying a signal at said output of said switch through said coupling capacitor; and,
   an analog-to-digital converter for converting said output from said amplifier to a digital signal; wherein
   said control means causes said first time period to extend over a reproducing mode of said apparatus and said second time period to extend over a recording mode of said apparatus; and wherein
   said recording/reproducing medium is an optical disk containing mirror surface portions formed between predetermined marks in tracks thereof, and said control means causes said selected time portion to correspond to one of said mirror surface portions.

6. A signal processing circuit as recited in claim 5, wherein said hold circuit has an input receiving said output of said switch.

7. A signal processing circuit as recited in claim 5, wherein said hold circuit and a first input terminal of said switch have a common input, and said hold circuit has an output terminal connected to a second input terminal of said switch.

8. A signal processing circuit as recited in claim 5, wherein said control means includes transistor means which causes said selected time portion to correspond to an average level of said input signal.

* * * * *